United States Patent
Salz

(10) Patent No.: US 9,889,928 B2
(45) Date of Patent: Feb. 13, 2018

(54) LIFT, PROPULSION AND STABILISING SYSTEM FOR VERTICAL TAKE-OFF AND LANDING AIRCRAFT

(76) Inventor: Manuel Salz, Almeria (ES)

( * ) Notice: Subject to any disclaimer, the term of this patent is extended or adjusted under 35 U.S.C. 154(b) by 445 days.

(21) Appl. No.: 13/392,674

(22) PCT Filed: May 5, 2010

(86) PCT No.: PCT/ES2010/000204
§ 371 (c)(1),
(2), (4) Date: Mar. 26, 2012

(87) PCT Pub. No.: WO2011/023834
PCT Pub. Date: Mar. 3, 2011

(65) Prior Publication Data
US 2012/0280091 A1    Nov. 8, 2012

(30) Foreign Application Priority Data

Aug. 26, 2009 (ES) .................................. 200901843
Feb. 11, 2010 (ES) .................................. 201000248

(51) Int. Cl.
*B64C 27/30* (2006.01)
*B64C 27/26* (2006.01)
*B64C 29/00* (2006.01)

(52) U.S. Cl.
CPC .............. *B64C 27/30* (2013.01); *B64C 27/26* (2013.01); *B64C 29/0025* (2013.01)

(58) Field of Classification Search
CPC ...... B64C 27/30; B64C 29/0025; B64C 27/26

USPC .............. 244/6, 7 R, 23 B, 55, 12.3, 66, 198
See application file for complete search history.

(56) References Cited

U.S. PATENT DOCUMENTS

| | | | |
|---|---|---|---|
| 1,662,406 A * | 3/1928 | Thompson | 244/6 |
| 3,298,633 A * | 1/1967 | Dastoli et al. | 244/2 |
| 6,340,133 B1 * | 1/2002 | Capanna | 244/6 |

FOREIGN PATENT DOCUMENTS

| | | | | |
|---|---|---|---|---|
| ES | 2288083 | 12/2007 | | |
| WO | WO 2004/024558 | 3/2004 | | |
| WO | WO 2006113877 A3 * | 4/2007 | ......... | B64C 29/0025 |
| WO | WO 2009-047376 | 4/2009 | | |

* cited by examiner

*Primary Examiner* — Valentina Xavier
(74) *Attorney, Agent, or Firm* — Robert M. Schwartz; Thomas Hamill

(57) ABSTRACT

The lift, propulsion and stabilizing system for vertical take-off and landing aircraft of the invention consists of applying during vertical flight on, below or in the interior of the fixed-wing aircraft one or more rotors or large fans each one with two or more horizontal blades, said rotors are activated by means of turboshafts, turbofans or turboprops with a mechanical, hydraulic, pneumatic or electrical transmission, and the respective motors. Using lifting and/or stabilizing and/or controlling fans and/or oscillating fins and/or air blasts. Placing the horizontal lifters near at least one end of the longitudinal axis and of the transverse axis of the aircraft. Generally said stabilizing elements form 90° with one another and with the central application point of the rotor or application of that which results from the lift forces.

6 Claims, 15 Drawing Sheets

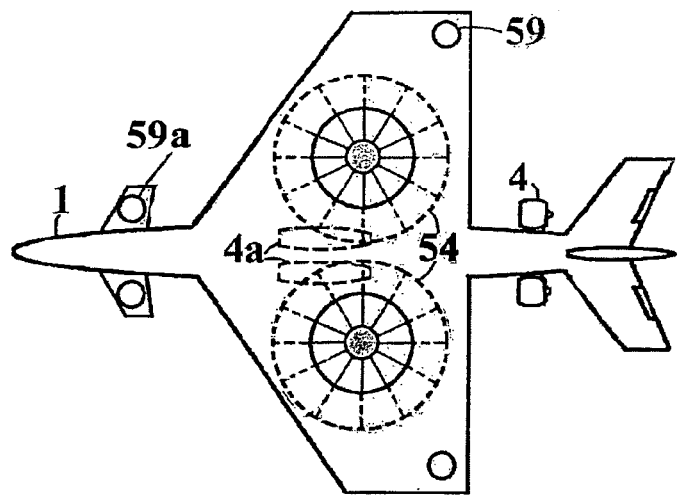
FIG. 22
FIG. 23
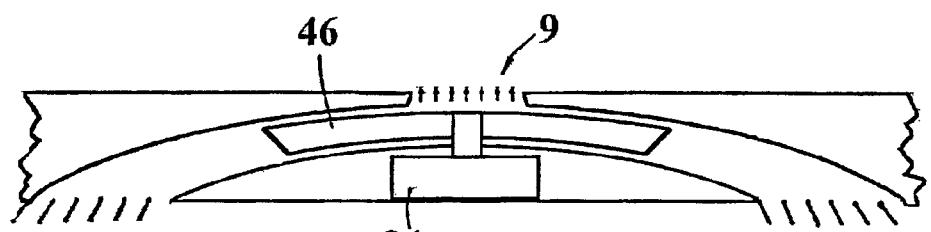
FIG. 24
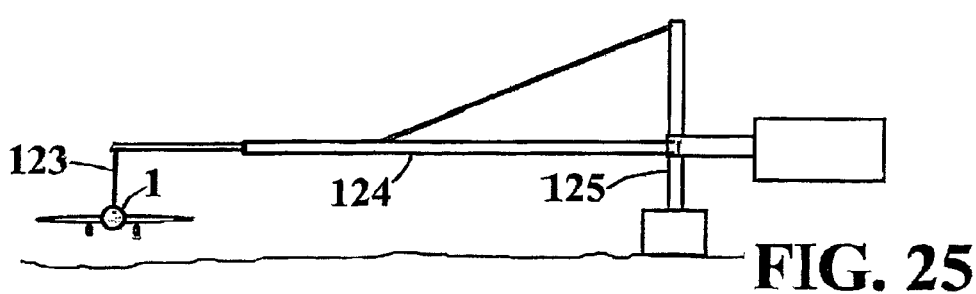
FIG. 25

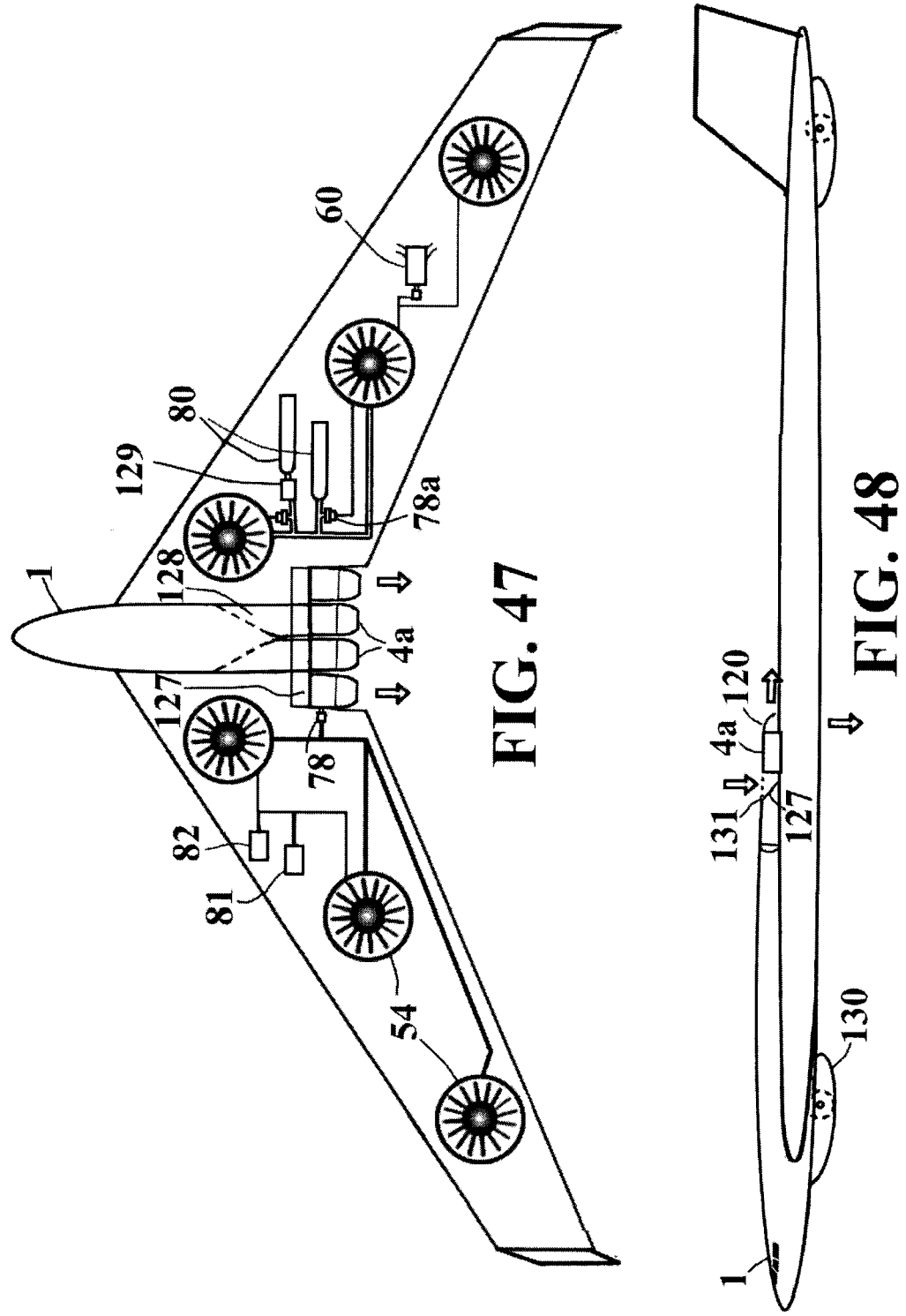

LIFT, PROPULSION AND STABILISING SYSTEM FOR VERTICAL TAKE-OFF AND LANDING AIRCRAFT

INDEX TO RELATED APPLICATIONS

This application claims the benefit of PCT application PCT/ES2010/000204, filed May 5, 2010, which claims the benefit of Spanish patent application numbers, P201000248 filed Feb. 11, 2010, and P200901843 filed Aug. 26, 2009, the disclosure of which are incorporated herein by reference in their entirety.

FIELD OF THE INVENTION

In systems for lift, propulsion and stabilisation of manned and unmanned aircraft, radio control, etc.

STATE OF THE ART

Aircrafts have little lift at low speed, they need maximum power, large wings and flaps for the takeoff and landing, they are dangerous because of their high speed next to the ground, they use heavy landing gears, large airports, expensive runways and do not carry out vertical takeoff. Helicopters are slow, expensive, heavy, complex and have little autonomy. Current VTOL and SVTOL aircrafts, with adjustable nozzles or not, have little safety or are unstable and do not efficiently exploit the energy of the turbines at low height and at low speed. All are difficult to control. The invention solves these drawbacks.

OBJECTIVE OF THE INVENTION

To be able to take off in VTOL and SVTOL mode combining the advantages of helicopters and aircrafts and making the piloting easier. Using only a part of the great power and lift available and different lift, stabilisation and control systems simultaneously.

To be able to fair shape, streamline or hide the blades when external rotors are used.

To use internal counter-rotating rotors, streamlined or not with aerodynamic profiles, if it uses one it will only be placed at or close to the centre of gravity.

Selectively to apply the drive energy to the propellers or impellers and lifters.

To provide large stability by using fans, tangential turbines and/or oscillating fins and/or air blasts, lifters and/or stabilisers, placing the horizontal lifters near at least one end of the longitudinal axis and of the transverse axis of the aircraft, stabilising fins at the exit of the rotors or the application of asymmetrical power by means of several rotors. Compensating quickly and efficiently, especially when electrical systems are used.

To eliminate the flaps, large wings and weights, and complicated landing gears and their systems.

To place the adjustable nozzles of the turbines at or below the centre of gravity of the aircraft.

To drive the rotors, fans and turbines mechanically, electrically, hydraulically or pneumatically.

To use turbopropellers and turboshafts for the lift and the propulsion.

To use ducted centrifugal/axial or axial fans and oscillating fins as propellers or impellers.

To use turboshafts, turbines, mini-turbines or micro-turbines with powerful permanent rare earth magnet generators at high rpm. The weight of the generator can be reduced to $\frac{1}{50}$ of the current weight. Light electric motors can be used.

To use very light turbines, similar to the turboshafts, without gears or shafts, with permanent rare earth magnet generators integrated into the area of the compressor.

To control the craft by applying differential energy to respective electromagnets of the oscillating fins.

DESCRIPTION OF THE INVENTION

The lift, propulsion and stabilising system and method for vertical takeoff and landing aircraft of the invention consists of applying during vertical flight on, below or in the interior of the fixed-wing aircraft one or more rotors or large fans each one with two or more horizontal blades, said rotors are activated by means of turboshafts, turbofans or turboprops with a mechanical, hydraulic, pneumatic or electrical transmission, and the respective motors. Using lifting and/or stabilising and/or controlling fans and/or oscillating fins and/or air blasts. Placing the horizontal lifters near at least one end of the longitudinal axis and of the transverse axis of the aircraft. Generally said stabilising elements form 90° with one another and with the central application point of the rotor or application of that which results from the lift forces.

One or two rotors or large fans can be placed in the interior of ducts, or the rotors be streamlined with an aerodynamic profile NACA 4412, 2412 or similar, at the height of the fuselage or thereon and can be centrifugal/axial or axial. Said rotors have fins diverting the flow of air driven to stabilise the aircraft. If necessary all the power can be applied to said rotors for five minutes. If a single rotor or large fan is used it is placed at, above or below the centre of gravity of the aircraft.

The external rotors are made of rigid or semi-rigid blades, with a fixed pitch, simple, folding and retractable. Each rotor with two or more blades, which are retracted and leant to the fuselage or they are introduced partially or totally into a channeled cavity of the upper area thereof and/or of the wings on the aircrafts with high wings, being faired or streamlined with its surface. It can use and keep another rotor on the lower area of the fuselage. Only the most external ends of the blades can be introduced.

The blades can be introduced into cavities of the same shape, streamlining or fairing their upper or external face with the surface of the fuselage of the aircraft. Magnets, springs or steel strips can support it when they are retracted. The steel strips hold it from its leading and trailing edge. The blades can be introduced laterally on an external retaining piece. The tips of the blades can be inclined downwards being housed and being retained in housings and equally inclined and reinforced from the fuselage. On the tips of the blades it can also have hooks which are supported on housings of the fuselage. The area of the housing of the blades must heat up.

The ends of the blades, preferably rigid, can have small lateral fins angled in a single direction, obliging the blades to be directed with the air ram when they are free. The blades have to have a fixed angle to prevent drag from being produced or their rotation when they are free. In this way, it is not necessary to retract the rotor and the blades.

The blades can be flexible with the external ends slightly curved downwards, so that when the rotor blades are retracted, they are leant against the surface of the fuselage, in a reinforced area.

The blades can rotate and be kept between the fuselage and longitudinal plates or bridges on and below said fuselage.

The operation of the rotors and fans can be ensured, complemented or reinforced with electric, hydraulic or pneumatic motors.

Pairs of rotors in counter-rotation can be used. When the rotors are extended in counter-rotation it increases the separation therebetween by means of a spring. If a single rotor is used it must be compensated with fins, fans or air blasts on the rudder.

One or more rotors can be used at, above or below the centre of gravity of the aircraft or several rotors regularly spaced on the surface thereof.

The rotors are coupled to the turbines or propelling engines by using hydraulic or air valves, or with manual, hydraulic, pneumatic or electric clutches and the corresponding rpm reducers. If a pneumatic one is applied, they do not need a reducer.

The electric motors of the rotors and of the fans can be engaged automatically when the motors receive energy, being disengaged if they lose it.

The blades and the shafts of the rotors can be articulated, or be telescopic with sliding shafts or with long thread in the interior of tubular elements and can be retracted together and extended vertically, or said shafts can swing with their ends articulated and joined to the blades by means of a fork and a spring tending to place the blades perpendicular to said axes when they are collected together, being moved by means of motors, actuators or rams. The threaded rotors are extended upon initiating the rotation in the lifting direction and are retracted if they rotate in the opposite direction, the wind can carry this out. Pressurised air or suction is applied to the telescopic blades in their interior, which is hollow. The shafts of the rotors have a wedge shape on their ends joining with the blades and when they are retracted they are introduced on a channeled cavity equally in the wedge of the fuselage. The most external rotor blades are wider than the inner one. A ram can introduce it into the hollow.

With the gas turbines at or close to the centre of gravity, a deflecting plate is used to direct the exit flow of air and gases downwards and inwards, it can also be applied on the flaps during the vertical flight. The turbines with adjustable or vector nozzles are placed and discharged below the centre of gravity of the aircraft or close thereto to compensate the torque created by the suction of the turbine. This reduces the instability and facilitates the stabilisation with fans or fins. Turbofan engines add some deflectors consisting of a backward upper projection of the cowl as a visor, articulated and turning about 45 degrees down around the axle on the front transverse edge. A forward lower projection of the cowl articulated and turning about 45 degrees around the axle on the rear transverse edge sucks the air from the upper zone during vertical flight. The deflectors are extended or retracted driven by one or more electric motors, actuators or hydraulic or pneumatic rams, deflecting downward the gases and air flow of the turbofan. Said deflectors when retracted are part of or are housed in the cowl of the turbine.

A variant uses only turboshafts engines, which drive the motors that drive the lift or main rotors and/or the centrifugal/axial or axial impellers ducted fans by means of a hydraulic, pneumatic or electrical system. A convergent nozzle can be added to these ducts or casings. The gases of the turboshafts are directed downwards and the suction is carried out from the upper area, generating an additional lift.

With several rotors, the stabilisation is achieved using asymmetric power.

The stabilising and control fans can be pairs of hydraulic, pneumatic or electric fans in series. Oscillating fins can be used. Air can also be injected through slots or ducts from the interior of the wings or stabilisers on the compensating fins stabilising the aircraft during the vertical flight. These fins act in the same way in horizontal flight with the drive air, the same control system being useful for the entire flight, is simple and very useful. Lateral flexible fins streamline the external air current.

Direct air blasts can be used in at least the tip of a wing, and of the nose and/or the tail, sent from at least two different sources by a pipe or duct forming part of the structure of the aircraft, beams, ribs and the like, these pipes or ducts will also be used to send the pneumatic of the motors driven pneumatically. The air blasts are controlled with flow-regulating valves.

The fans or turbines can be axial and centrifugal/axial and can be lifted magnetically and used simultaneously as propellers, stabilisers and/or lifters. The blades of the centrifugal/axial fans throw the flow of air radially and axially, contributing thereto the shell or fairing thereof. The blades can be flat and parallel with the planes passing through the rotation axis or can be twisted.

Several pairs of propeller fans can be used fixed to each side of the fuselage, which can have a slight upwards-facing angle and/or can rotate 90° around the transverse axis. Their flow can be straightened with fins.

One or more fans or turbines can be placed, ducted or not, on at least one wing, on a canard type aircraft fin or on the stabilisers, the lateral fans can be placed inclined around the transverse axis and the front ones around the longitudinal axis to counteract the torque of the rotor principal, they can also be placed on the horizontal and vertical stabiliser. Stabilising fins divert the flow of air to the exit of the ducted rotor fans. Two ducted fans can be used in counter-rotation and in series within a single duct or casing, and can be driven by two independent systems and motors.

The stabilising fans can use a variable lift flow to produce the stabilisation and can invert the flow to compensate with or without lift.

The ducted cetrifugo-axial rotors or fans have a disc and/or a cone or semi-ovoid in the rear area of the blades.

The oscillating fins, oscillate around an axis or of a steel band below the fuselage and wings, or on the exit edge of wings and stabilisers and have a permanent magnet or a ferromagnetic portion attracted alternately by electromagnets fed by electric currents or electrical signals of multivibrators or oscillators, varying the intensity or frequency the power of the lift or compensating flow is varied. For a better performance they can oscillate inside prismatic or angular walls.

The motors of the peripheral fans and turbines can be reversible, producing and storing current or pneumatic during the descent.

The bearings of fans and rotors can also be of air or magnetic.

Generators with rare earth permanent magnets are used, neodymium boron iron, of samarium-cobalt or the like, cooled by air, which rotate at the high speeds of the turbines, mini-turbines, etc. applying them directly thereto, or through a small reduction in rpm. The high frequency current generated is rectified and is applied to the oscillating fins and to the DC motors or low frequency AC motors through an inverter. The weight of the generator can be reduced to 1/50. Multiple brushless electric Motors can be applied to the rotors and fans. Its use reduces the necessary energy, the noise and the release of pollutants. The electric motors must also use permanent rare earth magnets.

It can use light gas turbines, mini-turbines, etc. for the exclusive use of electrical current, which do not use reducing gears or external axes, which can integrate a large alternator, whose permanent rare earth magnet of which is integrated into and rotates with the compressor, holding the stator by means of struts to a fixed bushing or to the case of the turbine, mini-turbine or micro-turbine. Because of its low weight it can only be used in the vertical flight.

During the takeoff and the landing the electrical or pneumatic energy can be added, and that from the batteries, fuel cells, supercapacitors or ultracapacitors applying it to the complementary electric or pneumatic motors reinforcing the motors of the main rotors and of the fans. Ultracapacitors can be used in military aircraft, using its energy to power directed-energy weapons: solid state lasers and high power microwave beams. A gearbox eases adding the energy of the different shafts or motors before applying it to the shafts of the rotors and fans. If the main lift rotors are activated with electric motors, said energy will be added directly thereto. The batteries will be of rapid discharge.

Gyroscopes detect the change of attitude with respect to the horizontal and to the heading or course, signals being generated which act on electric motors driving the fans, fins and flight controls. There may be a gyroscope for each motor or fan.

An additional system consisting of turbofans can be used, on which the fan of the shaft of the turbine is made independent by means of a clutch during the vertical flight.

The undercarriage legs can be shock-absorbing flexible steel strips and fixed, curved backwards, that can produce lift, which can be retractile and have wheels at their ends.

The changes of lift mode of the rotors to the mode provided by the wings are overlapped and are made smoothly, preventing abrupt changes of attitude.

In the ascent an umbilical electric cable joined to earth or to a rotating arm can be used which feeds energy to the aircraft up to a certain height or up to a certain speed, later being disconnected. For long flights, it is possible to ascend and descend hang from a helicopter or be enhanced with electric energy from a helicopter and an electric cable. It is also possible to lift the aircraft by means of a platform up to an initial height of the flight. All of this saves fuel and offers safety, especially in the takeoffs which is when the aircraft is heavier.

On long flights, mother aircraft or helicopter can be used for refueling once the aircraft carrying out the flight has ascended. Intermediate refueling can also be carried out throughout said flights.

The rotor has a brake, which eases introducing it, once stopped, into its housing.

The aircraft can use only four small wings and/or of little chord, two canard and two rear ones on positions of the stabiliser, so that the flow of the rotor has little opposition. In compensation the lower area of the fuselage can be flat.

While rising it can use a liquid thermically isolated gas, such as nitrogen, which activates pneumatic turbines or motors, which in turn move electrical generators. This system is economical and does not need heavy bottles. A heat exchanger can be placed at the exit of the bottles. The bottles could be launched and recovered after takeoff.

The air flow flaps of the ducted fans and rotors are driven with motors, are opened with the internal flow and are closed with the ram air and springs. They can also be driven automatically, open with the internal flow and close with the ram air. To improve the lift, the takeoffs and landings will be carried out with flat-fuselage aircraft directed to the wind with a positive attack angle.

The stators of the BLDC motors can be cooled externally by liquid nitrogen.

The aircraft will be built preferably with light or ultra light materials like carbon fiber or the like and the batteries, ultracapacitors, electric motors and generators have a high power-to-weight ratio.

During vertical flight, a variant uses as a main lifter turbofan engines or gas turbines located at or near the centre of gravity, directing downward its gases and air flow, its stability and additional lift is performed with oscillating fins and/or electrical centrifuge-axial or axial fans fed by batteries, ultracapacitors, fuel cells, generators, gas turbine, turboshaft, etc. At least one turbofan can be used as an auxiliary source, APU, etc. as a lifter during takeoffs and landings, and for propulsion in case of failure of other turbofan. Turbofan engines are housed inside the fuselage and during their use deflecting plates are actuated allowing propulsion or lift sucking air from the top or from the side of the fuselage.

During vertical flight, a second variant uses as main lifter oscillating fins acted by electromagnets and fed with batteries, ultracapacitors, fuel cells, generators, gas turbine, turboshaft, etc. They can be used also as stabilizers and for propulsion.

During vertical flight, a third variant uses as main lifter multiple centrifuge-axials or axial electric fans driven by electric motors and fed with batteries, fuel cells, generators, gas turbine, turboshaft, etc. At least one of these fans is rotating and is used for propulsion.

BRIEF DESCRIPTION OF THE DRAWINGS

FIGS. 3, 26, 27 and 48 show schematic, front and partial cross-sectional views of variants of aircrafts.

FIGS. 4, 5, 18 to 23, 38, and 47 are plan views of variants of the aircraft.

FIG. 13 also shows a schematic and cross-sectional view of a portion of wing or stabiliser and a control surface.

FIGS. 8, 14 and 24 show schematic and partial cross-sectional views of a dual-fan device.

FIGS. 25 and 42 show views of two Systems off support for aircraft takeoff.

DETAILED DESCRIPTION OF THE INVENTION

Figure 1:
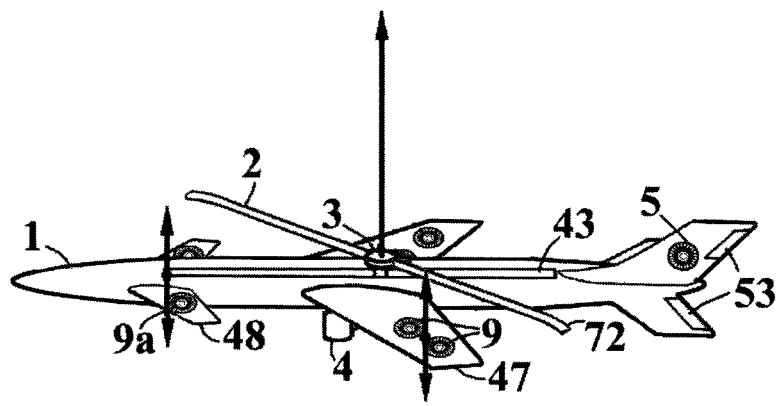
FIG. 1 shows a schematic and perspective view of an aircraft with the system of the invention.

The invention, FIG. 1, shows the aircraft fuselage (1) in vertical flight, the blades (2), the external rotor (3) of the sliding or telescoping type, the turbofan engines (4), the tail dual fan (5), the wing (47) and the canard wings (48). The large arrow indicates the lift force provided by the rotor. The small lift forces of the dual lift and stabilisers fans (9 and 9a) on the wing and canard fins. Sufficient stabilization is achieved by implementation of these at just two points. The other fans are used for lift. The blades are flexible and their ends (72) slightly curved downwards, it shows the optional housing (43).

Figure 2:
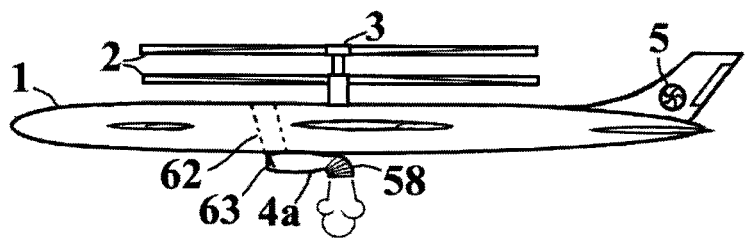
FIGS. 2, 6, 7 and 32 show schematic front views of variants of the aircraft of the invention.

FIG. 2 shows the aircraft fuselage (1), the blades (2), the shaft of the external upper rotor extended (3). The turbines (4a) with the vector nozzle (58), below the centre of gravity, sucking the air at the top of the duct (62) with the valve (63) open by a spring, said valve closes once the aircraft has reached a certain speed. Rotors are in counter-rotation and the tail rotor (5) is optional.

Figure 3:
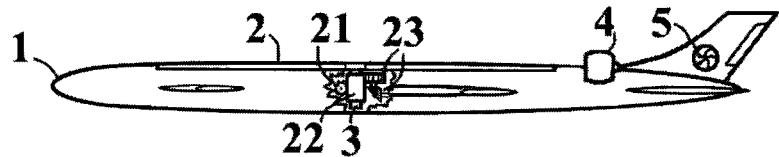

FIG. 3 shows the aircraft fuselage (1), the external rotor blades retracted and faired shaped in the area above the aircraft fuselage, and the vertically sliding external rotor shaft with an actuator or motor and gears (21). The rotor-shaft turns within the tubular casing (22), and is supported by some bearings. The rotor-shaft (3) turns driven by the turbine, the power shaft and gears (23).

Figure 4:
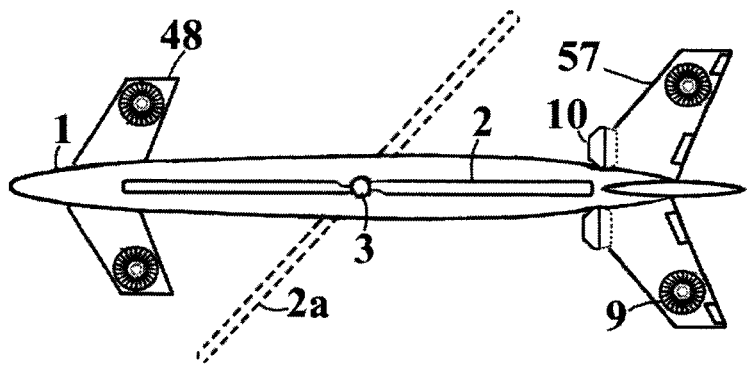

FIG. 4 shows the aircraft fuselage (1), the external upper rotor shaft (3), its blades (2) and the optional external lower rotor (2a) at the lower part off the fuselage, the dual centrifugal/axial propulsion fans (10), the dual lift and stabiliser (9), the four mini-wings located on the stabiliser (57) and on the canard wings (48), outside of the rotor radius. Smaller wings can be used in the central area. The propulsion fans, or turbines, are located outside the central area. The lower part of the fuselage can be flat.

Figure 5:
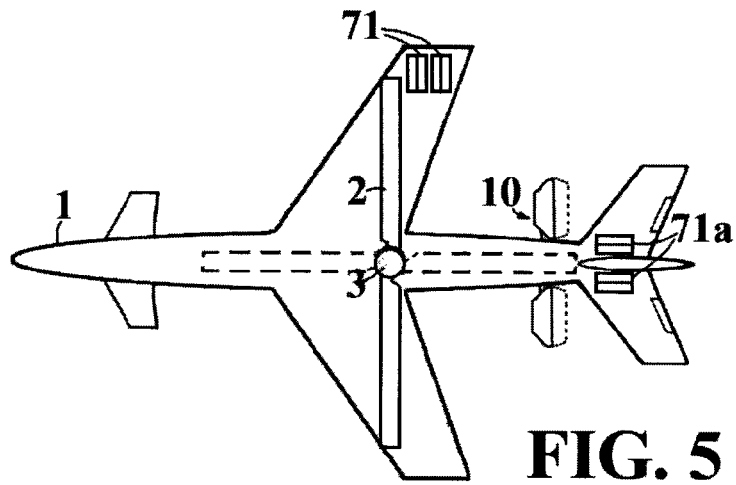

FIG. 5 shows the canard aircraft (1), the external rotor shaft (3), the centrifugal/axial propulsion fans (10), and the horizontal balance oscillating fins (71) on the wing and on the tail (71a). Fans and fins are used at two points, at 90 degrees to the main rotor. This shows the blades (2) positioned above the wings of a high-winged aircraft. The blades represented by dotted lines can be those of a four-blade rotor.

Figure 6:
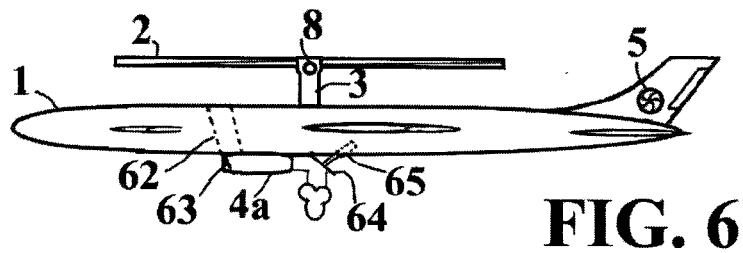

FIG. 6 shows the aircraft fuselage (1), the blades (2), the external tipper rotor shaft (3), the fork shaft (8), the tail rotor (5). The turbine (4a) exit flow is beneath the centre of gravity, and incises against the inclined plate (64), operated by the ram (65) and deflecting the flow downwards and inwards. It can suck air from above through the duct (62) by opening the valve gate (63), it closes by a spring and when the aircraft moves forward at a certain speed. The valve flapper closes once the aircraft has reached a particular speed.

Figure 7:
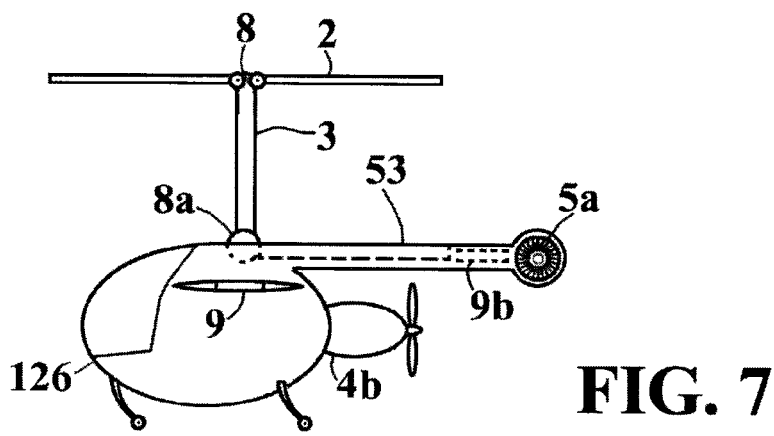

FIG. 7 shows the aircraft fuselage (126), the extended blades (2), the external rotor shaft (3), the turboprop (4b), the rotor and blades linked (8 and 8a), the tail rotor (5a), the stabilising dual fan (9), the tail (53) with a stabilising dual fan (9b) and the housing of the retracted blades, shown by dotted lines.

Figure 8:
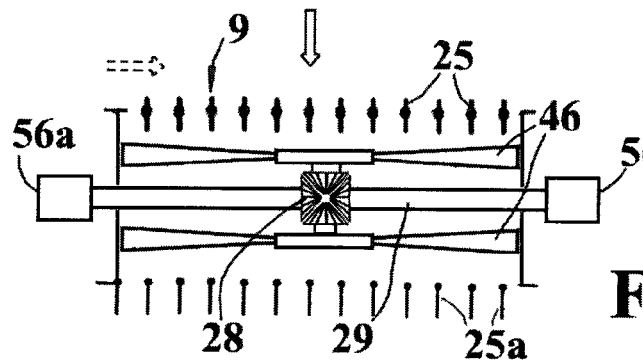

FIG. 8 shows the dual axial fan (9), its counter-rotating blades (46) using common motors (56 and 56a), the gears (28) and their driving shafts (29). The motors are engaged when they are fed electrically. The fans can be independently operated. The flaps (25) are operated by an actuator. It also opens automatically to the air from the fans, and closes with air ram and the action of some springs. This gearing system can be used on rotors located above and below the fuselage. Both external rotors would extend or move outwards, driven by gears (28) and shafts (29).

Figure 9:
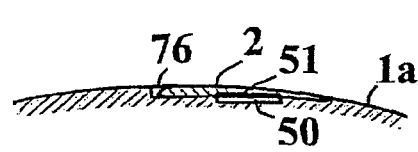
FIGS. 9, 10, 10A, 10B and 11 show cross-sectional views of both blades leant against or introduced in a housing of the fuselage.

FIG. 9 shows the blade (2) placed in the reinforced upper or lower zone of the fuselage (1a), which is attracted by the fix magnet (50) and its ferromagnetic portion (51). It adds the flexible retainer (76).

Figure 10:
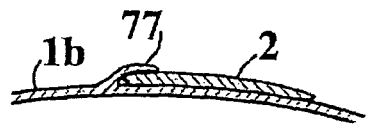

FIG. 10 shows the blade (2) placed in the external reinforced upper and lower zone of the fuselage (1b), fastened by the lateral projecting retainer (77). The extremity of the blade is laterally inclined so that the air ram press it towards the interior of the retainer (77). To perform this, the blade must be turned in the opposite direction.

Figure 10A:
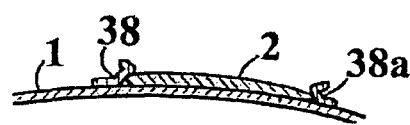

FIG. 10A shows the blade (2) leant against the fuselage (1) and secured from its leading and trailing edges, by means of the steel bands (38 and 38a).

Figure 10B:
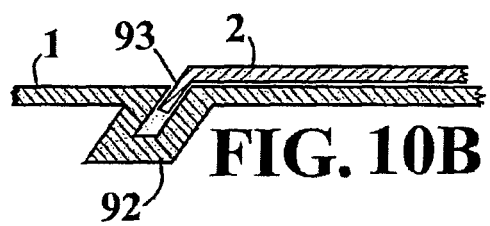

FIG. 10B shows the blade (2), the inclined and reinforced housing (92) in the fuselage (1) where the inclined tip of the leant blade is inserted.

Figure 11:
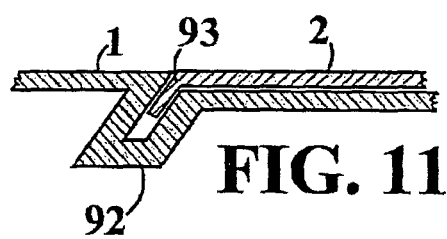

FIG. 11 shows the blade (2) leant to the fuselage (1), the reinforced inclined housing (92) in the fuselage (1) where the inclined tip (93) of the leant blade is inserted.

Figure 12:
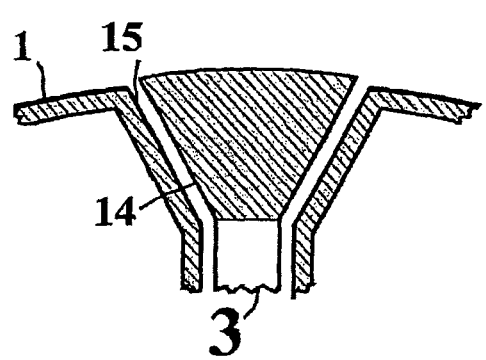
FIG. 12 shows a cross-sectional view of a portion of fuselage and rotor.

FIG. 12 shows the extremity of the external rotor (3) with the wedge (14) that introduces in the channel of the fuselage's (1) sloping walls (15), forcing retraction in order to aid steering in the longitudinal slot. This applies with just one rotor. If two rotors are used, the external one is wider, and the internal one is introduced deeper.

Figure 13:
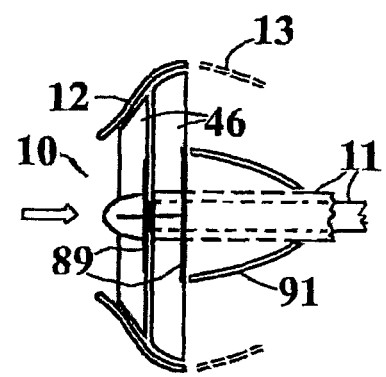
FIG. 13 shows a partial and cross-sectional view of a propelling fan.

FIG. 13 shows the dual propulsion centrifugal/axial fan (10), it can be also lifter and/or stabiliser, its shafts (11), the duct or case (12), the convergent nozzle (13) and the blades (46), flat and parallel with the planes passing through the rotation axis, they can be twisted. It adds the deflectors disks (89) and the cone or semiovoid optional (91).

Figure 14:
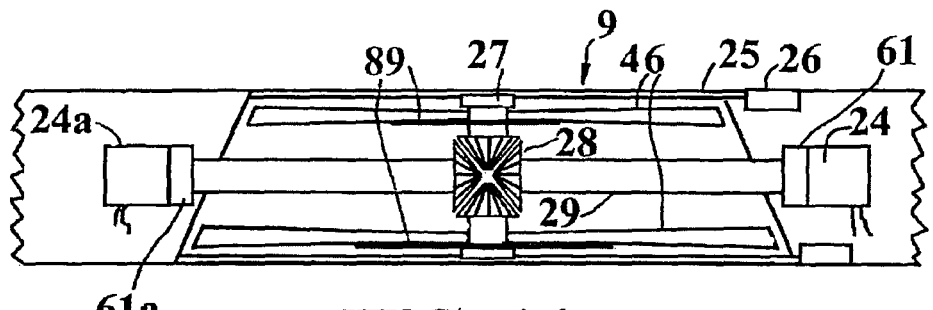

FIG. 14 shows the dual centrifugal/axial fans (9) with the deflector disks (89), their counter-rotating blades (46), simultaneously driven by the electric motors (24 and 24a) and the clutches (61 and 61a), the flap (25) driven by actuator or rams (26), the supports and bearings (27), the gear box (28) and its shafts (29). Some bearing are not shown. The fans can be operated independently.

Figure 15:
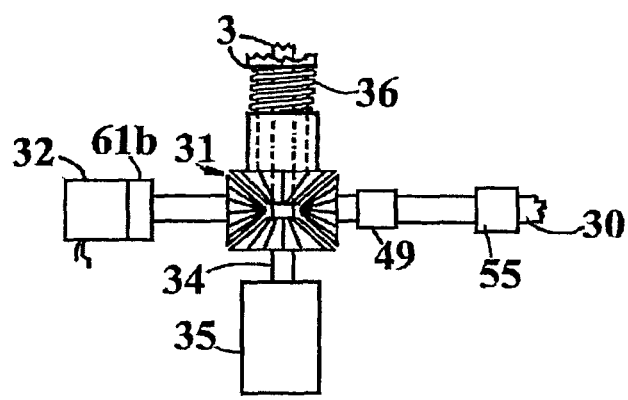
FIG. 15 shows a schematic and partial cross-sectional view of a rotor and the driving gears.

FIG. 15 shows the external rotor shafts in counter-rotation, mutually longitudinally extended, driven by the gears (31), the shaft principal (30) and revolution reducer (55) via either the clutch (49), or the complementary electric booster or safety motor (32) and its rpm reducer clutch (61b). The rotors extend with the actuator (35) and the rod (34), this mainly applying to the external rotor, which, when extending, extends the spring, mutually separating the rotors for greater safety. Bearings are not shown. (35) Can be an electric motor or a turbine pneumatically driven.

Figure 16:
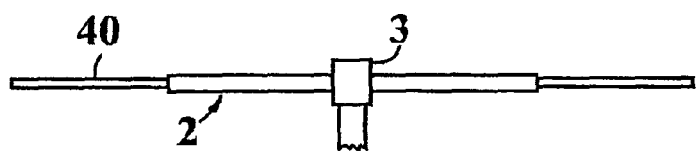
FIGS. 16 and 17 show front and partial views of rotor variants.

FIG. 16 shows the external rotor (3), the telescopic hollow blades and its external portion (40), they are extended with air pressure and retracted with suction.

Figure 17:
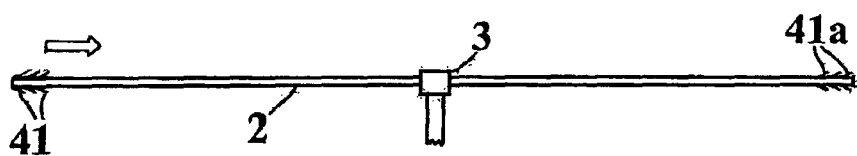

FIG. 17 shows an external rotor (3), the ends of the blades (2), preferably rigid, can have small lateral fins (41 and 41a) angled in a single direction, obliging the blades to be directed with the air ram when they are free. The arrow shows the air flow. Can be used only the upper or the lower fins.

Figure 18:
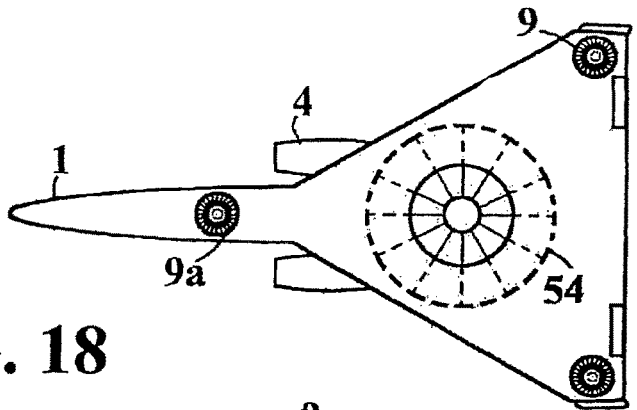
Figure 19:
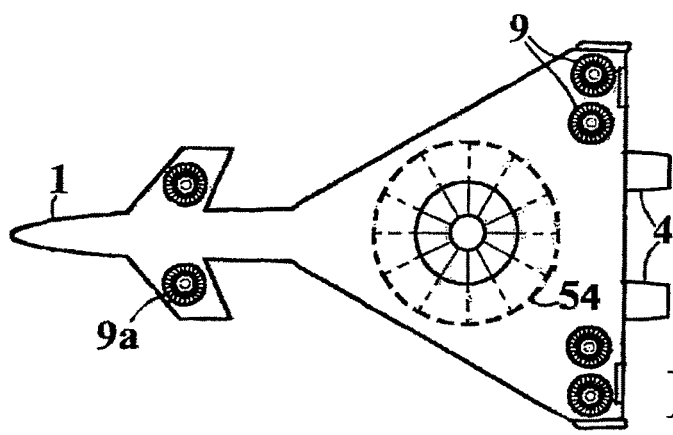
Figure 20:
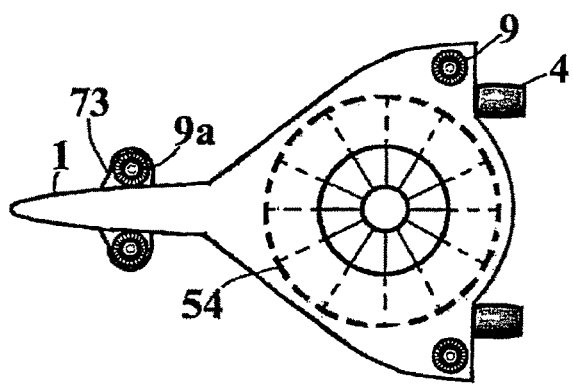

FIGS. 18 to 20 show aircraft (1) with pair of main internal centrifugal/axial rotors (54) in counter-rotation and at the centre of gravity, with stabilising fins in their lower areas, the propellers (4), and the lifting and stabilising dual fans optional and in counter-rotation (9 and 9a). If a fan fails, the power of the next fan is increased. The rotors can be axial. The forward fans (73), FIG. 21, can be retracted and hidden during the vertical. flight. The system is similar to that used in the F-35, which does not use centrifugal/axial fans in or over the centre of gravity, and it adds some stabilising fans.

Figure 21:
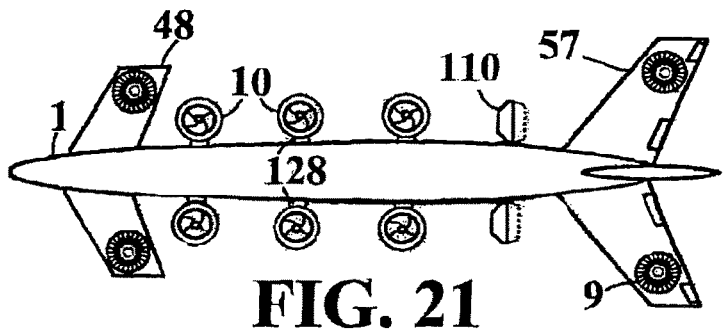

FIG. 21 shows the fuselage of the aircraft (1), dual centrifugal/axial lifting and propulsion fans (10), and the lifting fans (110) which extend turning around their axes (128) when the air current is applied and due to the flow effect, and when the current is removed they retract staying under or inside the fuselage, the double fans or rotors, lifting and stabilizing (9), the stabilizer (57) and the canard fins (48). The wings can also be in the central area when it is not used a rotor.

FIG. 22 shows the aircraft (1), the pairs of internal centrifugal/axial or axial rotors in counter-rotation (54), with stabilising fins, the turbofan engines (4) and the jet engines (4a) useful for vector nozzles and inclined plates or flaps deflectors, the direct stabilising air jets (59 and 59a) placed near the at least one end of the longitudinal axis and of the traverse axis of the aircraft.

FIG. 23 shows the aircraft (1), with three or four pair of internal centrifugal/axial or axial rotors (54) in counter-rotation, with stabilising fins, which are not shown in the figure, and turbofan engines (4) and the jet engines (4a) useful for vector nozzles and inclined plates or flaps deflectors. The rotor can be axial.

Aircrafts shown in FIGS. 18 to 20 and 22 to 23 can provide its stabilization using stabilising fins in the air flow.

FIG. 24 shows the fan centrifuge-axial (9) driven by the electric motor (24) and its blades (46).

FIG. 25 shows the aircraft (1a) electrically powered through the cable (123) supported by the arm (124) rotating around the shaft (125).

Figure 26:
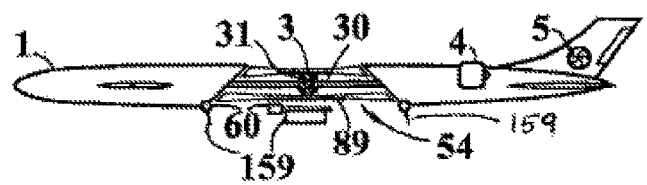

FIG. 26 shows the aircraft (1), the pairs of internal centrifugal/axial rotors principal (54), with the deflecting discs (89), their shafts (3), the turboprop engines (4), the stabilising fan optional (5), the power shaft (30), the gear box (31) and the stabilising fins (159) which driven by the motors (60) divert the air flow. The rotor can be axial and can be driven by power shafts or motors totally independent.

Figure 27:
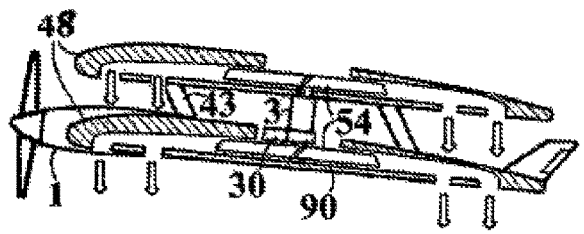

FIG. 27 shows the aircraft (1), the rotor-shafts (3) and piece of power shaft (30), the dual centrifugal/axial rotors (54) and the fairing of the rotors (48) with an aerodynamic profile. Instead of the deflecting disks it is used the fix deflecting wall (90). One rotor is in the fuselage and the other at the top of the aircraft forming a high-wing, supported by the struts (43).

Figure 28:
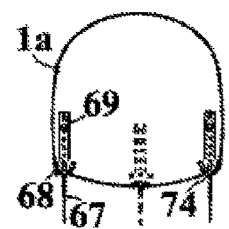
FIGS. 28 and 33 show schematic and partial views of fuselage cross-sections.

FIG. 28 shows the fuselage (1a), and the oscillating fins around the shafts with their opposite arms alternatively electromagnetically attracted. Its actuators are not shown.

Figure 29:
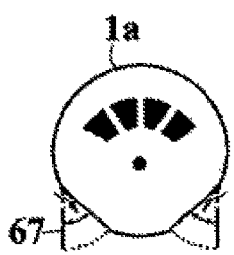
FIGS. 29 and 30 show fuselages front views with variants of oscillating fins.

FIG. 29 shows the fuselage (1a), and the oscillating fins (67) adapted to the lateral flat and inclined of a special fuselage. The arrows show the air inlet.

Figure 30:
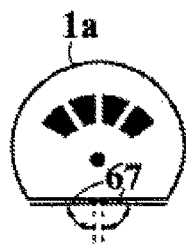

FIG. 30 shows the fuselage (1a), and the oscillating fins (67), adapted adjacent to the flat bottom of a special fuselage.

Figure 31:
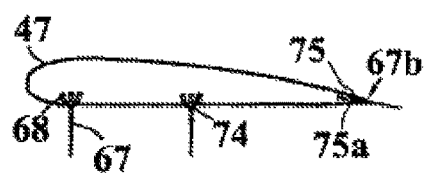
FIG. 31 shows a cross-section view of a wing with oscillating fins.

FIG. 31 shows the wing (47), and the oscillating fins (67), turning around the shafts (74) alternatively attracted by electromagnets (68). They can be stabilising, lifting and propelling. The fins can also turn around a support hoop, and retract, fixing to the intrados during horizontal flight. They can remain adhered to the wing via actuators, magnets, suction on the internal surface, or a slight outward tilting of the edge of the outflow. The fin (67b) is applied to the trailing edge, where (75 and 75a) are membranes, either elastic or filled with foam rubber, streamlining the fin with the wing.

Figure 32:
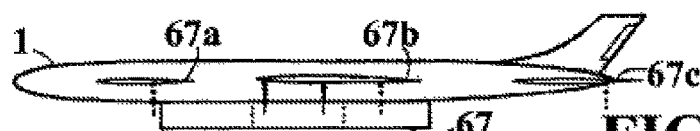

FIG. 32 shows the fuselage (1a), and the oscillating fins (67, 67a, 67b y 67c). They can be formed by several sectors, as it is shown with dotted lines.

Figure 33:
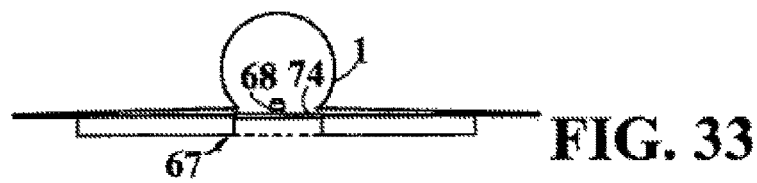

FIG. 33 shows the fuselage (1a), with the oscillating fin (67), turning around the shaft (74) and driven by the electromagnets (68).

Figure 34:
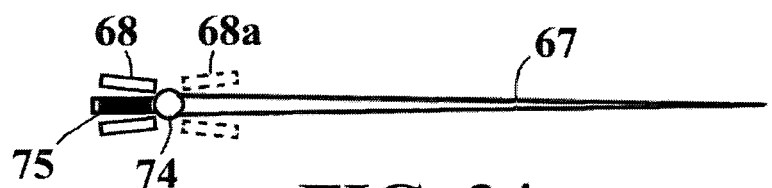
FIG. 34 through 36 show plan views of different variants of oscillating fins.

FIG. 34 shows the oscillating fin (67) driven by the electromagnet (68), which can be placed in the optional position (68a), the turning shaft (74) and the ferromagnetic piece (75).

Figure 35:
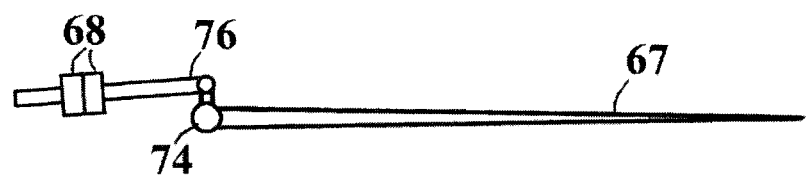

FIG. 35 shows the oscillating fin (67) driven by the electromagnet (68) that attracts the ferromagnetic link (76) around the shaft (74).

Figure 36:
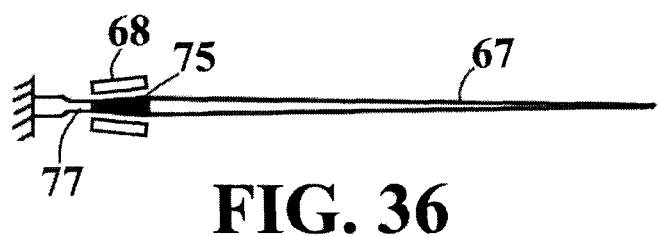

FIG. 36 shows the oscillating fin (67) driven by the electromagnet (68), that attracts the ferromagnetic link (75) flexioning the steel band (77).

Figure 37:
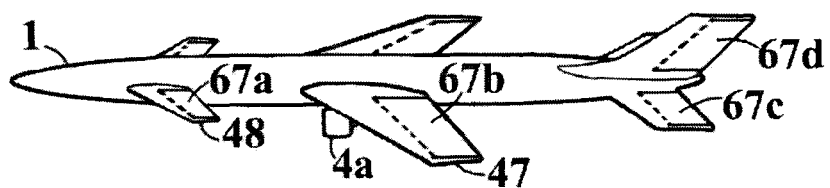
FIG. 37 shows a schematic and perspective view of an aircraft with a variant of oscillating fins.

FIG. 37 shows the aircraft (1), the oscillating fins (67a, 67b, 67c and 67d) in rest or propelling horizontally, the wings (47), the canard wings (48) and the turbofan engine (4).

Figure 38:
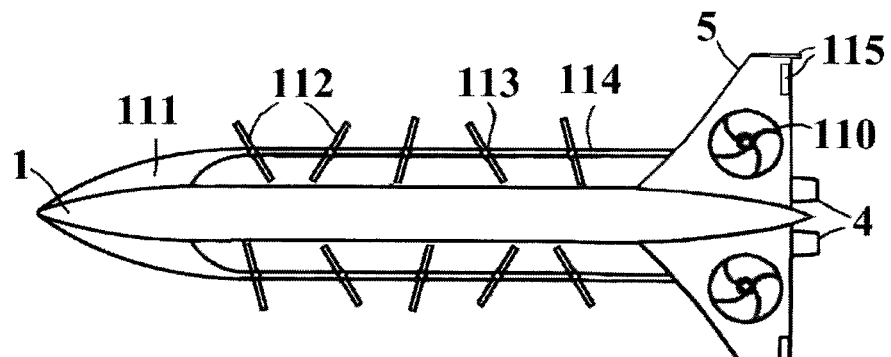

FIG. 38 shows the fuselage of the aircraft (1), the gas turbines (4), in the stabilizer (5) has the rotating fans (10) which are use for lift and propulsion, the canard wings (111), the fans (112) rotating around the axes (113) and are supported between two beams or spars (114) and the control fins (115).

Figure 39:
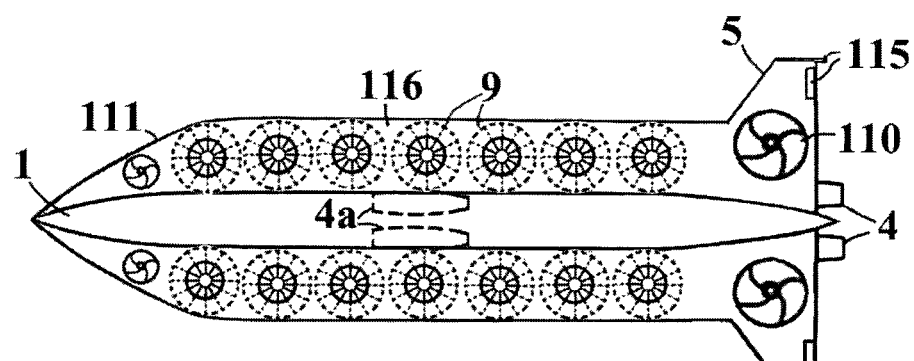
FIG. 39 shows a plan view of a fan variant.

FIG. 39 shows the fuselage of the aircraft (1), the gas turbines (4), in the stabilizer (5) has the rotating fans (10) which are use for lift and propulsion, the canard wings (111), the centrifuge-axial fans (9) in the fuselage side shields or thin wings (116) and the control fins (115). You can use lifting and propulsion turbofan engines (4a) in the centre of gravity.

Figure 40:
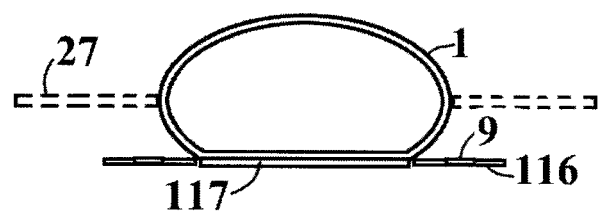
FIGS. 40 and 41 show cross-section views of the aircraft shown on FIG. 39.

FIG. 40 shows the fuselage (1), the fans (9), wings (27), side shields (116) and the flat bottom surface (117).

Figure 41:

FIG. 41 shows the fuselage (1), the fans (9) and side shields (116).

Figure 42:
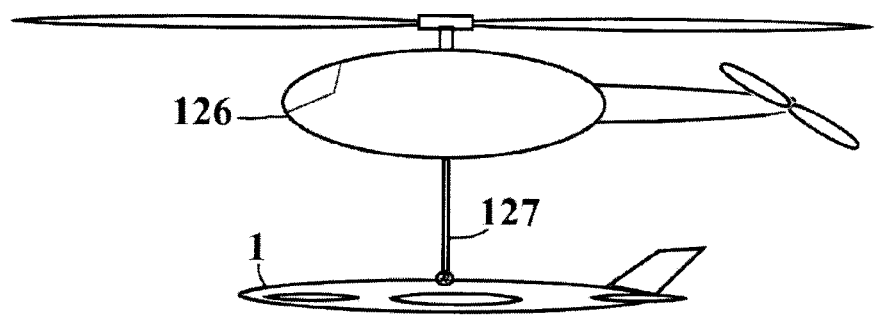

FIG. 42 shows the aircraft (126) supported by the quick-release cable (124) and the helicopter lifter (126).

Figure 43:
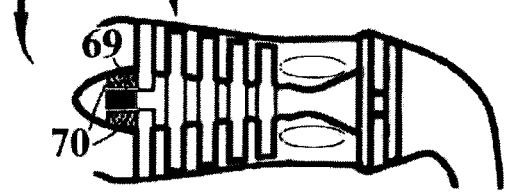
FIGS. 43, 44 and 45 show schematic cross-section views of variants of special turbines using integrated generators.
Figure 44:
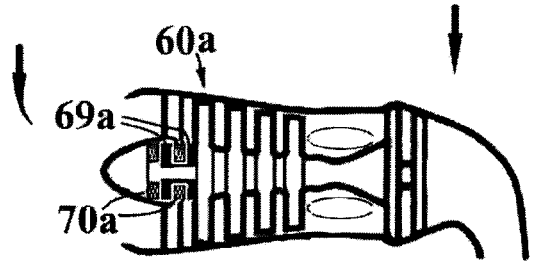

FIG. 43 shows the mini-turbine or micro-turbine (60), with the permanent rare earth magnets (69) in the compressor area and the stator or coil (70) joint to the casing by struts or fixed blades.

Figure 45:
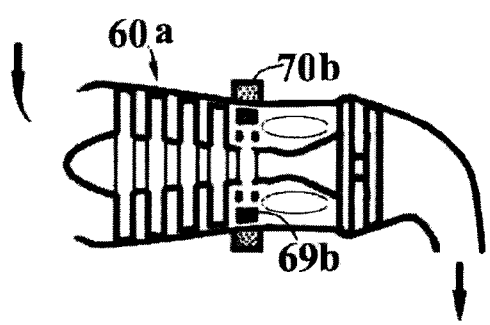

FIG. 45 shows the mini-turbine or micro-turbine (60) with several stages of rare earth permanent magnets (69a) in the compressor area, and the stator (70a) joint to the casing by struts or fixed blades.

Figure 46:
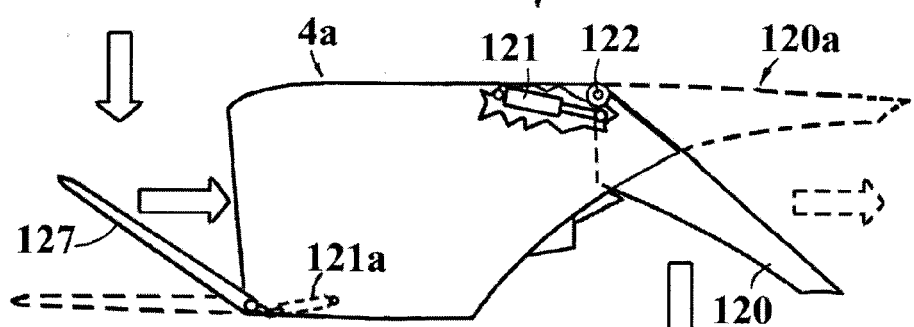
FIG. 46 shows a turbofan engine.

FIG. 46 shows the mini-turbine or micro-turbine (60) with the rare earth permanent magnets (69b) in the compressor, and the stator (70b) around it.

The previous mini-turbines or micro-turbines do not use reducing gears or external shafts.

FIG. 46 shows the turbofan (4a) with the projection of the cowl flap (120) deflectance the gas and air flow downward during vertical flight, the fin retracted (120a), rotating around the axis (122) by the ram (121). At the front the fin (127) is projected forward as a lower cowl visor, rotating around the shaft (131) by the ram (121a). The air is sucked up during vertical flight.

FIG. 47 shows the fuselage of the flying wing (1), the turbofan (4a), the flow is sucked through the front plates (127), rotating around the axis (131). And sucking by the lateral inclined channels (128) during horizontal flight, the lifting and stabilizing electric fans are driving by motors fed by batteries (81), fuel cell (129), the turbofan generators (78), the turboshaft (60) and operated by air cylinders or liquid nitrogen (80) the latter with the heat exchanger (129). Once in horizontal flight the two central turbines can stop and close its front air intakes. If these are used for propulsion in horizontal flight they take the air through channels (128).

FIG. 48 shows the flying wing of the previous figure, the fuselage (1), the turbofan (4a), outflow plate (120) and deflecting plate or fins at the entrance of the turbofan (127). Aerodynamic fins (130) cover the optional fixed undercarriage by the action of the ram air.

Figure 49:
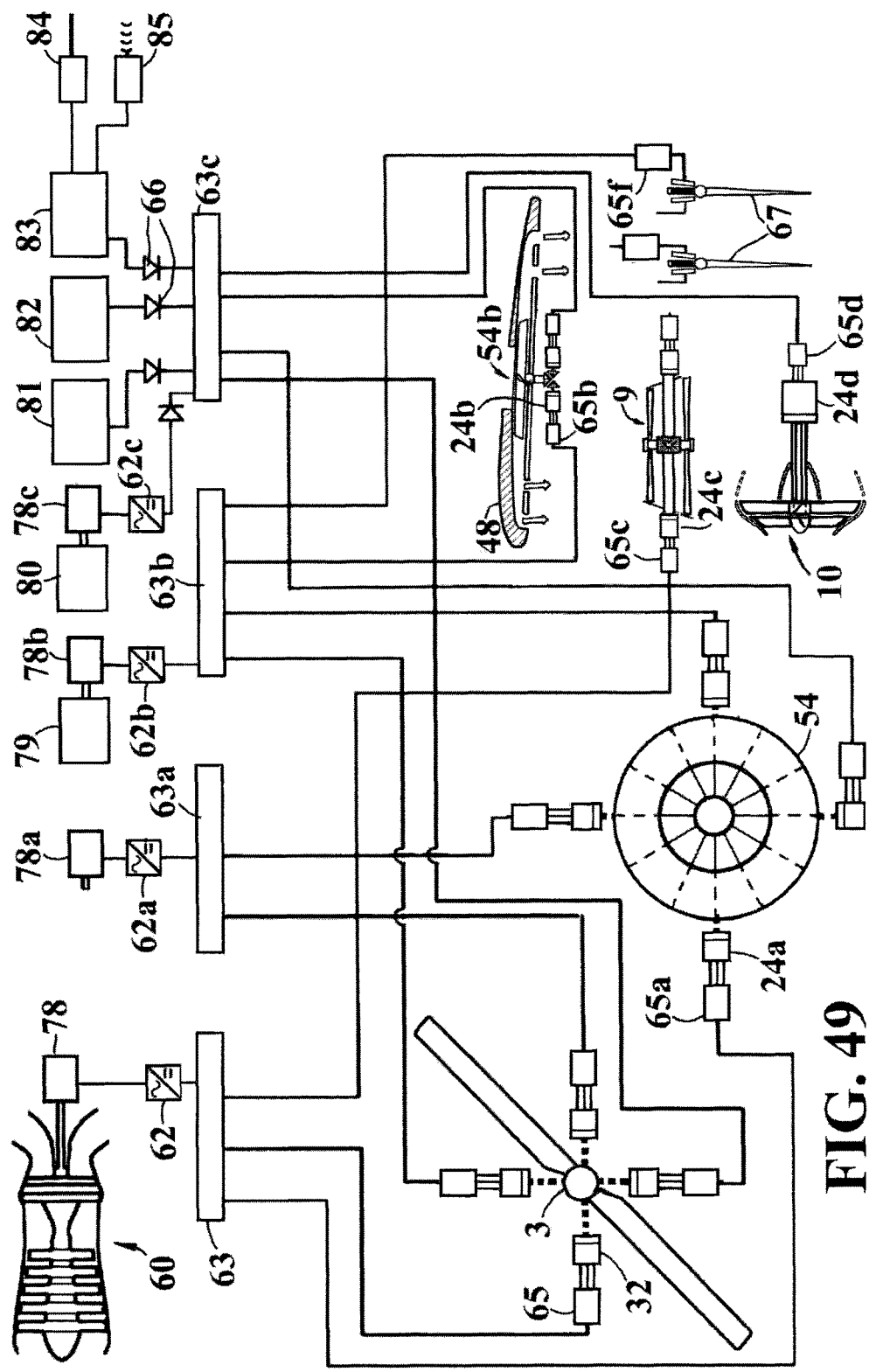
FIG. 49 shows a block diagram of an electric system feeding the motors of the rotors, fans, turbines and the electromagnets driving the oscillating fins.

FIG. 49 shows the turbine, mini-turbine or micro-turbine (60), which drives the generator (78) at between approximately 10,000 to 200,000 rpm. Its alternate current is sent to the rectifier (62), which sends the continuous current obtained to the bar (63). The generators (78a, 78b and 78c) send current to the rectifier (62a, 62b and 62c) and once rectified are applied to the rectified DC bars (63a, 63b and 63c). Examples are some fans or propellers whose bars (63, 63a, 63b, and 63c) feed the motors (32, 24a, 24b and 24c) to the external rotor (3), inner rotor (54), internal rotor (54b) fairing with aerodynamic profile (48) and fans (9 and 10) through the corresponding frequency controllers (65, 65a, 65b and 65c) driven by signals from the gyroscopes or command. When several motors are used a planetary gear system drive the rotor or the fan. The motor are driven by pneumatic or nitrogen (80) and the generator 78c, the battery (81), the fuel cell (82) and supercapacitors or ultracapacitors (83), these also feed the laser gun (84) and the microwave emitter (85) and the bar (63c) through the semiconductor (66). The bar (63b) feeds through the oscillators (65f) the electromagnets (67) of the oscillating fins. Each fan uses at least one motor and each motor can be fed from other frequency controllers if the main power fails.

Figure 50:
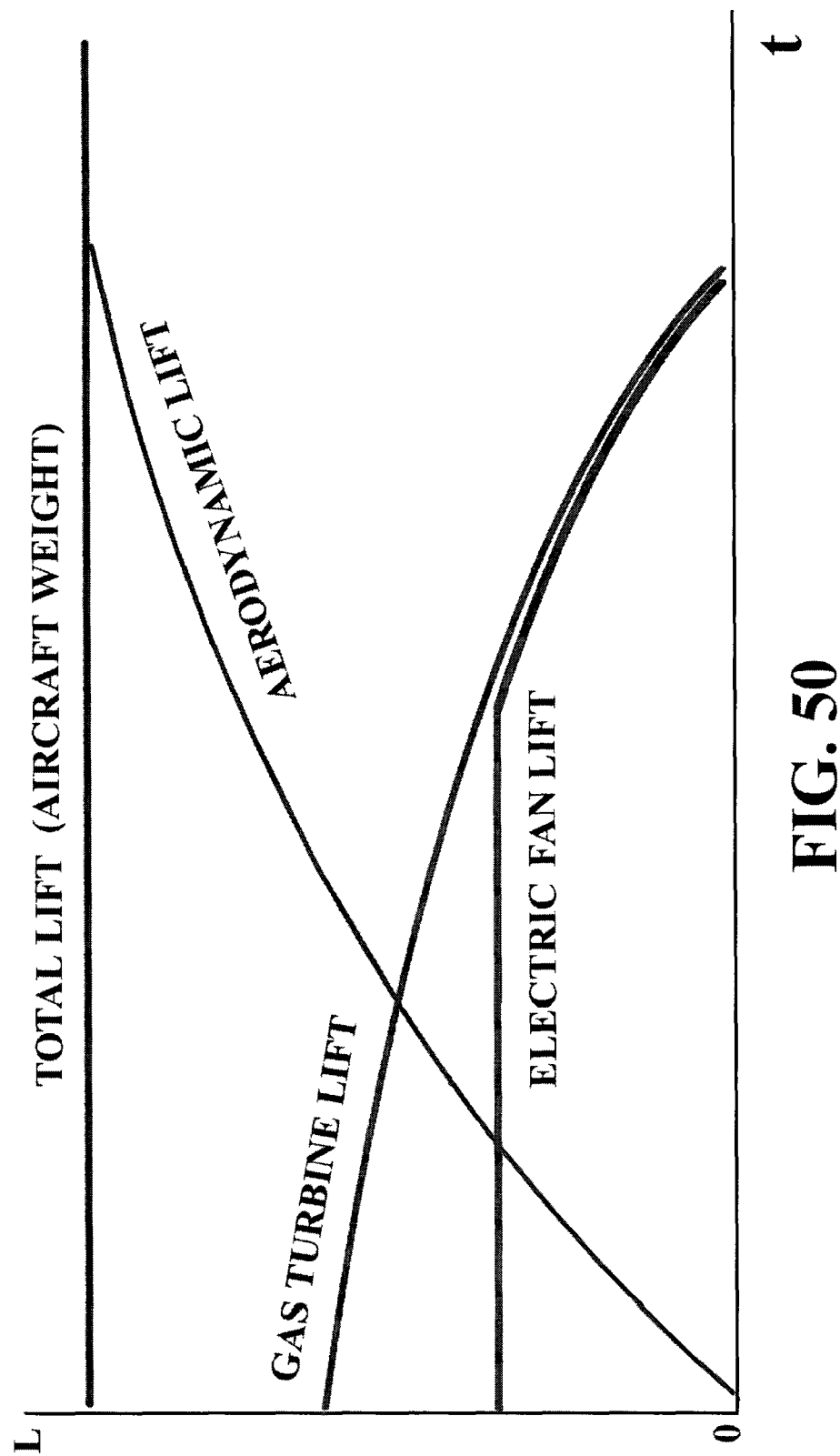
FIGS. 50, 51 and 52 show lift curves graphics of aircrafts using different systems of the invention.

FIG. 50 shows a graphic of lift during the ascent, when operating with gas turbines, electrical fan motors fed by batteries, generators, ultracapacitors, fuel cells, etc. and aerodynamic lift.

Figure 51:
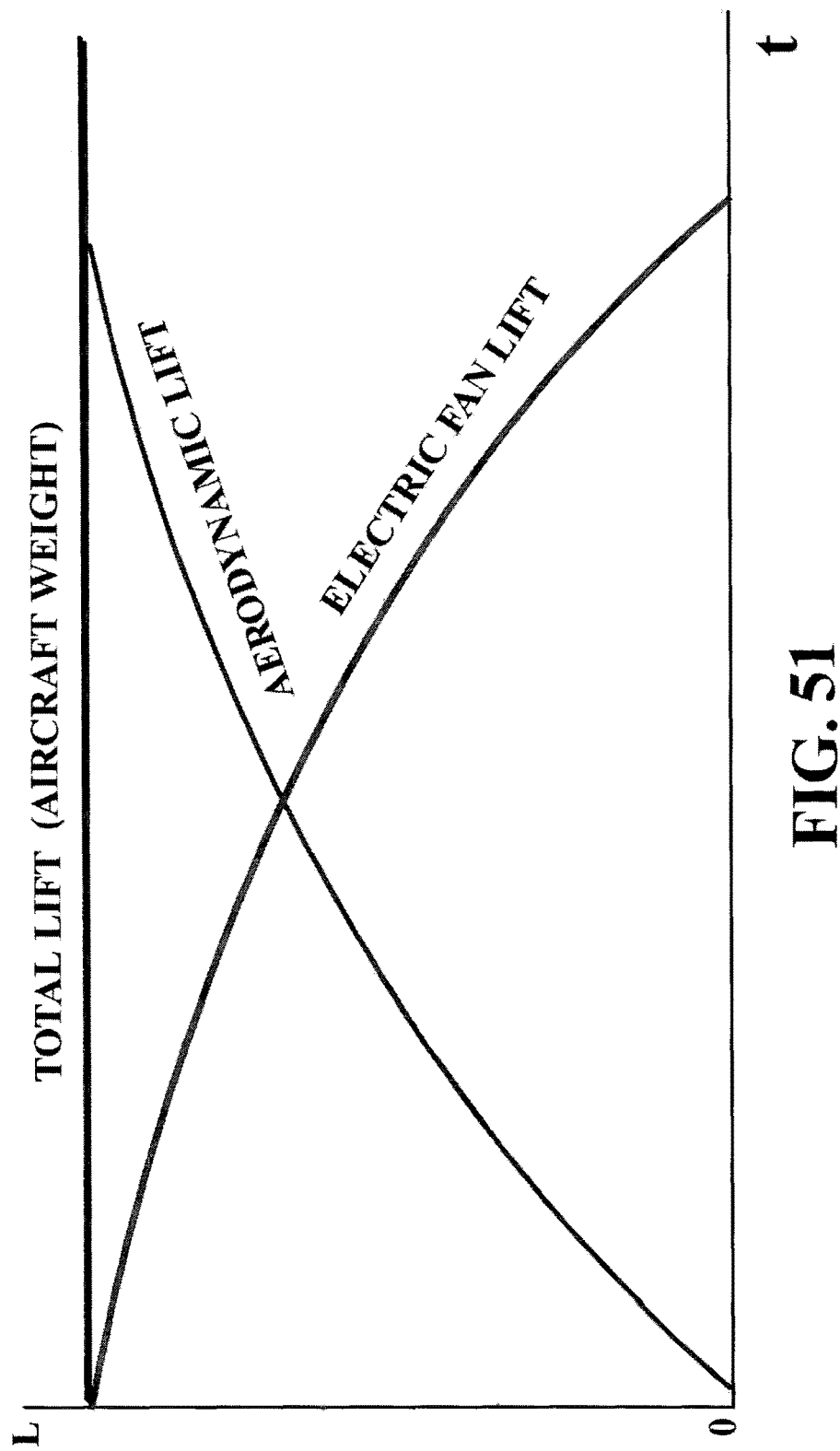

FIG. 51 shows a graphic of lift during the ascent, when are involved electric fans fed by batteries, electric generators, ultracapacitors, fuel cells, etc. and the aerodynamic lift.

Figure 52:
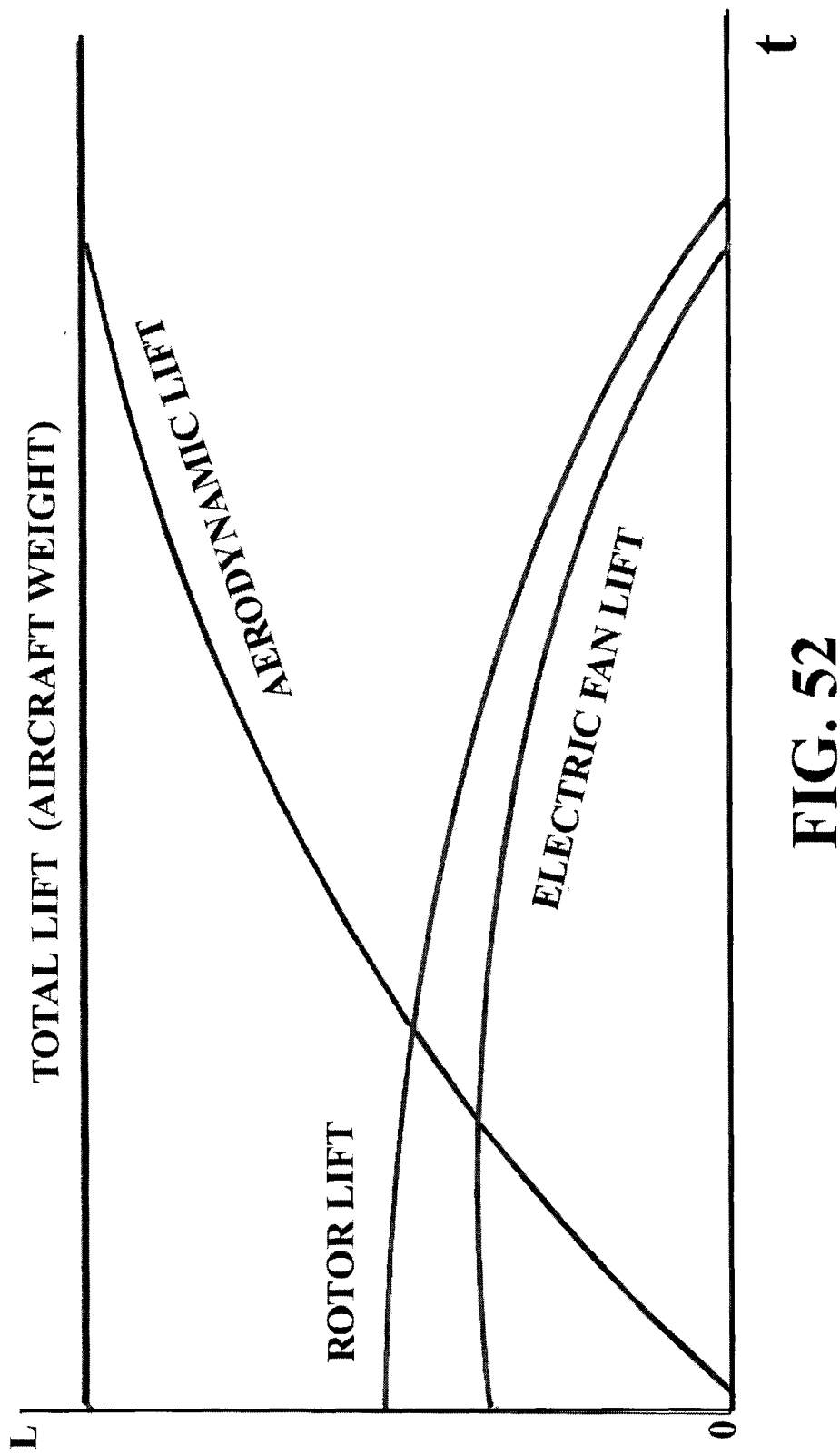

FIG. 52 shows a graphic of lift during the ascent, involving a helicopter rotor, electric fans fed by generators, ultracapacitors, fuel cells, etc. and aerodynamic lift.

The lift charts for the descent are similar to those shown above, the difference is due to the use of lower weights. FIGS. 50 to 52 show how the aerodynamic lift is produced once the aircraft starts the ascent, using a climb attitude and turbofan or engines horizontal thrust, said aerodynamic lift is got accelerating the propulsion engines till when said lift is equal to the weight of the aircraft, in that moment the rotor lift and the electric fans lift should be zero, which had been decreasing simultaneously from the beginning of the climb.

Said sequence is produced during 20 to 30 seconds approximately and is produced by the engines, and the auxiliary system as: Batteries, fuel cell, turbofan generators, turboshafts, and electric motors operated by air cylinders or liquid nitrogen, etc. All devices rotors, fans, etc. during the vertical flight, work approximately at 50 or 75% of their maximum power, in such a way that when one fails the other increases its power to the maximum (100%).

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

The invention claimed is:

1. A lift, propulsion and stabilization system for vertical takeoff and landing aircraft including a fuselage having a longitudinal axis comprising:
    a fixed-wing aircraft having a pair of fixed wings, a rotor shaft (3), said rotor shaft having two or more horizontal blades (2) attached thereto, said rotor shaft located atop said fuselage and coincident with said longitudinal axis of said fuselage above said fixed wings,
    said rotor shaft activated by means of an engine selected from the group consisting of turboshafts (60), turbofans (4) or turboprops, and
    a plurality of motors powering a plurality of fans, said fans located on said pair of fixed wings, with a first fan being located on each one of said fixed wings proximal said fuselage and a second fan being located on said each one of said fixed wings on an outer side of said first fan, where
    a single fan is located on each of a pair of canard wings, where said pair of canard wings are located near a front end of the longitudinal axis of said fixed wing aircraft,
    and a fan located on a vertical tail, said vertical tail is centrally located at said rear end of the longitudinal axis of said fixed wing aircraft, and
    said each one of said plurality of fans passes through a ducted passageway which is located on said pair of fixed wings, said pair of canard wings, and said vertical tail.

2. A lift, propulsion and stabilization system for vertical takeoff and landing aircraft according to claim 1, wherein said rotor shaft (3) is located above a center of gravity of said vertical takeoff and landing aircraft.

3. A lift, propulsion and stabilising system for vertical takeoff and landing aircraft according to claim 1, wherein said plurality of fans are axial.

4. A lift, propulsion and stabilization for vertical takeoff and landing aircraft according to claim 1, wherein the operation of said fans is provided from the group of motors and engines consisting of electric, hydraulic and pneumatic motors and engines.

5. A lift, propulsion and stabilization system for vertical takeoff and landing aircraft according to claim 1 wherein said plurality of fans are reversible, giving greater control of said vertical takeoff and landing aircraft.

6. A lift, propulsion and stabilization system for vertical takeoff and landing aircraft including a fuselage having a front portion, a middle portion and a rear portion,
    canard wings horizontally attached proximal said front portion of said fuselage,
    fixed wings horizontally attached proximal said middle portion of said fuselage, stabilizer wings horizontally attached proximal said rear portion of said fuselage,
a tail vertically attached to said rear portion of said fuselage,
a rotor shaft located vertically above said fuselage middle portion, said rotor shaft including horizontal blades, said rotor shaft activated by means of an engine selected from the group consisting of turboshafts (60), turbofans (4) or turboprops,
a plurality of motors powering a plurality of ducted fans, one of said ducted fans located on each of said canard wings, two of said ducted fans located on said fixed wings, and one of said ducted fans located on said tail, whereby said plurality of said ducted fans and said rotor provide both lift and stabilization to said VTOL aircraft.

\* \* \* \* \*

UNITED STATES PATENT AND TRADEMARK OFFICE
CERTIFICATE OF CORRECTION

PATENT NO.       : 9,889,928 B2
APPLICATION NO.  : 13/392674
DATED            : February 13, 2018
INVENTOR(S)      : Manuel M. Saiz It is certified that error appears in the above-identified patent and that said Letters Patent is hereby corrected as shown below:

On the Title Page

At Column 1, Line 2 of Item (12) delete "Salz" and insert --Saiz--

At Column 1, Line 6 delete Item (76) and insert:
--(76) inventor: Manuel M. Saiz, Almeria (ES)--

Signed and Sealed this
Nineteenth Day of June, 2018

Andrei Iancu
*Director of the United States Patent and Trademark Office*